(12) United States Patent
Lee et al.

(10) Patent No.: US 9,594,420 B2
(45) Date of Patent: Mar. 14, 2017

(54) TOUCH PANEL AND CONTROLLING METHOD THEREOF

(71) Applicants: APEX MATERIAL TECHNOLOGY CORP., Keelung (TW); IMAGINATION BROADWAY LTD., New Taipei (TW)

(72) Inventors: Shang-Li Lee, Keelung (TW); Zong-Bin Liao, Keelung (TW); Ke-hao Ding, Keelung (TW)

(73) Assignees: APEX MATERIAL TECHNOLOGY CORP., Keelung (TW); IMAGINATION BROADWAY LTD., New Taipei (TW)

( * ) Notice: Subject to any disclaimer, the term of this patent is extended or adjusted under 35 U.S.C. 154(b) by 73 days.

(21) Appl. No.: 14/556,618

(22) Filed: Dec. 1, 2014

(65) Prior Publication Data

US 2016/0154451 A1 Jun. 2, 2016

(30) Foreign Application Priority Data

Aug. 8, 2014 (TW) .............................. 103127218 A

(51) Int. Cl.
*G06F 3/044* (2006.01)
*G06F 1/32* (2006.01)
*G06F 3/041* (2006.01)

(52) U.S. Cl.
CPC ............ *G06F 1/3262* (2013.01); *G06F 3/044* (2013.01); *G06F 3/0416* (2013.01)

(58) Field of Classification Search
CPC .... G06F 1/3262; G06F 1/3215; G06F 1/3231; G06F 3/0416; G06F 3/044
See application file for complete search history.

(56) References Cited

U.S. PATENT DOCUMENTS

| 8,508,490 B2 | 8/2013 | Huang et al. | |
| 2010/0110038 A1* | 5/2010 | Mo | G06F 3/044 345/174 |
| 2012/0127124 A1* | 5/2012 | Zanone | G06F 1/3231 345/174 |
| 2013/0027344 A1* | 1/2013 | Choon | G06F 3/044 345/174 |
| 2013/0293507 A1* | 11/2013 | Singh | G06F 3/044 345/174 |
| 2015/0123930 A1* | 5/2015 | Singh | G06F 1/3262 345/174 |

(Continued)

FOREIGN PATENT DOCUMENTS

TW I419034 12/2013

*Primary Examiner* — Lixi C Simpson
(74) *Attorney, Agent, or Firm* — WPAT, PC; Justin King

(57) ABSTRACT

The controlling method for a touch panel is disclosed. The controlling methods includes: executing a waking-up procedure to output a waking-up signal; comparing a measured value of the waking-up signal with a pre-determined threshold value; the touch panel staying in a power-saving mode if the measured value of the waking-up signal is smaller than the positive pre-determined threshold value or larger than the negative pre-determined threshold value; and the touch panel starting a detection procedure if the measured value of the waking-up signal is larger than the positive pre-determined threshold value or smaller than the negative default threshold.

13 Claims, 12 Drawing Sheets

(56) References Cited

U.S. PATENT DOCUMENTS

2015/0346895 A1* 12/2015 Bokma ................ G06F 3/0416
 345/173
2016/0048213 A1* 2/2016 Zafiris ................... G06F 3/017
 345/174

* cited by examiner

TOUCH PANEL AND CONTROLLING METHOD THEREOF

CROSS-REFERENCE TO RELATED APPLICATIONS

This application claims the benefit of priority to Taiwan patent application Ser. No. 103127218 entitled "CONTROLLING METHOD FOR A TOUCH PANEL AND DEVICE THEREOF", filed Aug. 8, 2014, which is also incorporated herein by reference.

FIELD OF THE INVENTION

The present invention pertains to a controlling method for a touch panel, and more particularly pertains to a touch panel having a waking-up procedure. Executing the waking-up procedure can effectively decrease sampling times performed by the touch panel for detecting the location of a touch point, so can reduce sampling frequency and effectively save unnecessary power consuming.

BACKGROUND OF THE INVENTION

A touch panel or screen is one of the major interfaces between human and machine, and as a location recognition device, can ingeniously combine input and display interfaces, and therefore has the advantages of saving device space and user-friendly operation. Nowadays it has been generally applied to a wide variety of consuming or industrial electronic products. For example, PDAs (Personal Digital Assistant), palm-sized PCs (Personal Computers), tablet computers, mobile phones, handwriting input devices for a smart phone, IAs (Information Appliances), ATMs (Automated Teller Machines) and POS (Points-of-Sale), etc., which can generally be seen in various occasions of business and industry applications.

A touch panel can recognize more precisely the touch point of an external object with electrical conductivity by a device detecting electric capacity and thus sensing the change of electric field to recognize the location of the touch point. Please refer to FIG. 1, which is a diagrammatic sketch of a conventional projected-capacitive touch panel 100. The touch panel 100 includes a plurality of first electrode (i.e. driving electrode) stripes 120 and a plurality of second electrode (i.e. sensing electrode) stripes 130 both on an active area. The driving electrode stripes 120 and the sensing electrode stripes 130 are overlapped but insulated from each other. The driving electrode stripes 120 and the sensing electrode stripes 130 are electrically connected to a control unit 110. The control unit 110 can transmit detected touch event information through other interfaces to other circuit or module, such as a CPU of a computer system.

When the active area is scanned, the control unit 110 makes the driving electrode stripes 120 issue driving signals in turn, which then make the sensing electrode stripes 130 detect. When one of the driving electrode stripes 120 is driven and the electrical changes of the sensing electrode stripes 130 is detected, the control unit 110 can determine that a touch event occurs within or near the overlapped area of the driving electrode stripes 120 and the sensing electrode stripes 130.

As a result, to scan the overlapped areas of the driving electrode strips 120 and the sensing electrode stripes 130, the driving electrode strips 120 must be driven in turn and the sensing electrode stripes 130 are detected in sequence. Assuming the time of detecting the electrical change on the sensing electrode stripes 130 simultaneously is t and the number of the driving electrode strips is M, then total time for scanning the active area is M*t. However, the control unit 110 actively and repeatedly drives the driving electrode stripes 120 in turn under the operating status after the conventional projected-capacitive touch panel 100 is turned on. Even if no external object with electrical conductivity touches the active area, the control unit 110 still repeatedly drives the driving electrode stripes 120 in turn. Thus, the control unit 110 repeatedly reports the CPU more and more times in per unit time, while most of the detected and reported signals are invalid, causing unnecessary power consumption on the touch panel 100.

Summarily, since users demand for higher and higher functionality for all kinds of electronic devices, the electronic devices need to drive various systems, causing a lot of loss of power. Moreover, with the users' demand for the longer standby time of electronic devices, a touch panel and a controlling method thereof capable of effectively saving consumed power are needed on the market.

SUMMARY OF THE PRESENT INVENTION

In light of the aforementioned background of the invention, the present invention provides a touch panel having a waking-up procedure. The touch panel executes the waking-up procedure to determine whether to execute sampling and detecting the touch point to recognize the location of the touch point. It can, therefore, effectively decrease the sampling times performed by the touch panel and then lower the frequency of detecting the location of a touch point, so can solve the problem of unnecessary power consumption.

In order to achieve one, some or all of the above stated objectives or others, the embodiments of the present invention provide a controlling method for a touch panel. The touch panel comprises an active area and a processing module, and a first electrical layer and a second electrical layer both spreading on the active area, in which the first electrical layer includes a plurality of first electrodes and the second electrical layer includes a plurality of second electrodes. The controlling method includes: executing a waking-up procedure for outputting a waking-up signal; comparing a measured value of the waking-up signal with a pre-determined threshold value, wherein the touch panel stays in a power-saving state if the measured value of the waking-up signal is smaller than the positive pre-determined threshold value or larger than the negative pre-determined threshold value; and the touch panel starting a detection procedure if the measured value of the waking-up signal is larger than the positive pre-determined threshold value or smaller than the negative default threshold.

In an embodiment, the method of executing the afore-said waking-up procedure includes: driving the first electrodes in turn or in groups; and, detecting electrical changes of the first electrodes for outputting the waking-up signal. In another embodiment, the method of executing the afore-said waking-up procedure includes: driving the second electrodes in turn or in groups; and, detecting electrical changes of the second electrodes for outputting the waking-up signal. In another embodiment, the method of executing the afore-said waking-up procedure includes: driving the first electrodes in turn or in groups; and, detecting electrical changes of the second electrodes for outputting the waking-up signal. In another embodiment, the method of executing the afore-said waking-up procedure includes: driving the second electrodes in turn or in groups; and, detecting electrical changes of the first electrodes for outputting the waking-up signal.

In an embodiment, the touch panel further comprises a layer of waking-up electrodes disposed in the active area, and the method of executing the afore-said waking-up procedure includes: driving the waking-up electrodes in turn or in groups; and, detecting electrical changes of the waking-up electrodes for outputting the waking-up signal. In another embodiment, the method of executing the afore-said waking-up procedure includes: driving one part of the waking-up electrodes in turn or in groups; and, detecting electrical changes of the other part of the waking-up electrodes for outputting the waking-up signal. In another embodiment, the method of executing the afore-said waking-up procedure includes: driving the waking-up electrodes in turn or in groups; and, detecting electrical changes of the first electrodes or the second electrodes for outputting the waking-up signal.

In an embodiment, the layer of waking-up electrodes is disposed between the first electrical layer and the second electrical layer, and shape of the waking-up electrodes are arranged in the active area for fitting in shape of the first electrodes or the second electrodes. In another embodiment, the layer of waking-up electrodes is disposed at the same layer with the first electrical layer and insulated from the first electrical layer, and the shape of the waking-up electrodes are arranged in the active area for fitting in the shape of the first electrodes. In another embodiment, the layer of waking-up electrodes is disposed at the same layer with the second electrical layer and insulated from the second electrical layer, and the shape of the waking-up electrodes are arranged in the active area for fitting in shape of the second electrodes.

By said touch panel having a waking-up procedure, the present invention can promptly determine if there is contact or approach on the surface of the touch panel with any touch point. After executing the waking-up procedure for outputting one single waking-up signal, the touch panel starts a detection procedure according to the waking-up signal for detecting a location of the touch point. It can effectively decrease sampling times performed by the touch panel for detecting the location, so can reduce sampling frequency and effectively save unnecessary power consuming.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE INVENTION

It is to be understood that both the foregoing general description and the following detailed description are exemplary and explanatory only and are not restrictive of the invention, as claimed. It should be noted that, as used in the specification and the appended claims, the singular forms "a", "an" and "the" include plural referents unless the context clearly dictates otherwise. Thus, for example, reference to "a material" may include mixtures of materials; reference to "a display" may include multiple displays, and the like. References cited herein are hereby incorporated by reference in their entirety, except to the extent that they conflict with teachings explicitly set forth in this specification.

Figure 1:
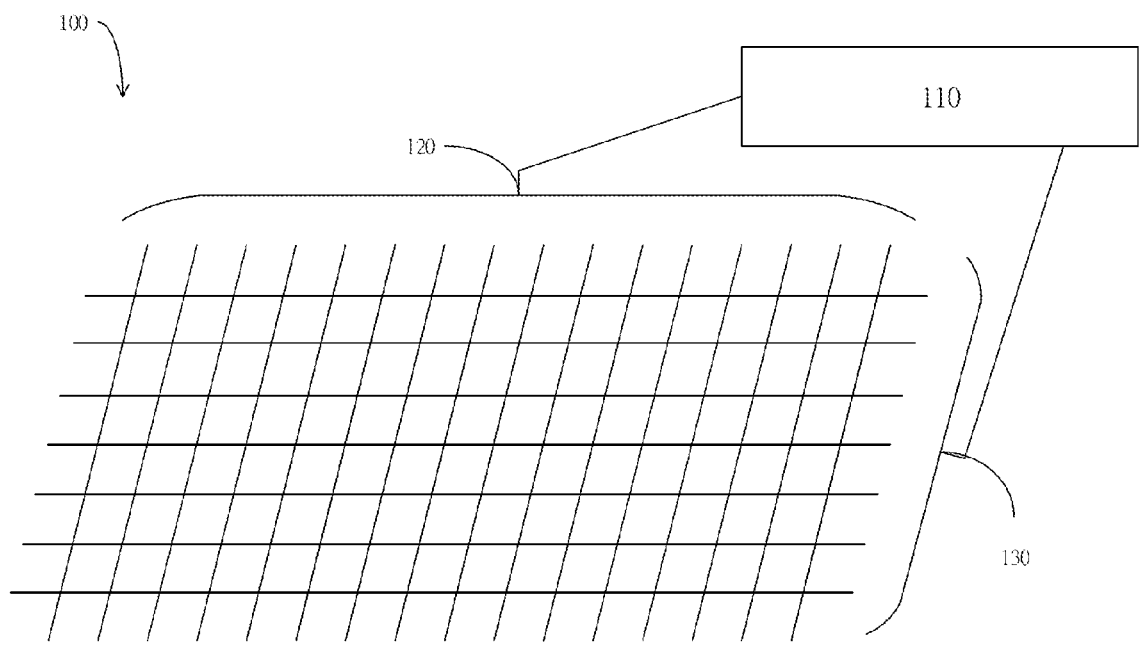
FIG. 1 depicts a diagram of a conventional projected-capacitive touch panel 100.
Figure 2:
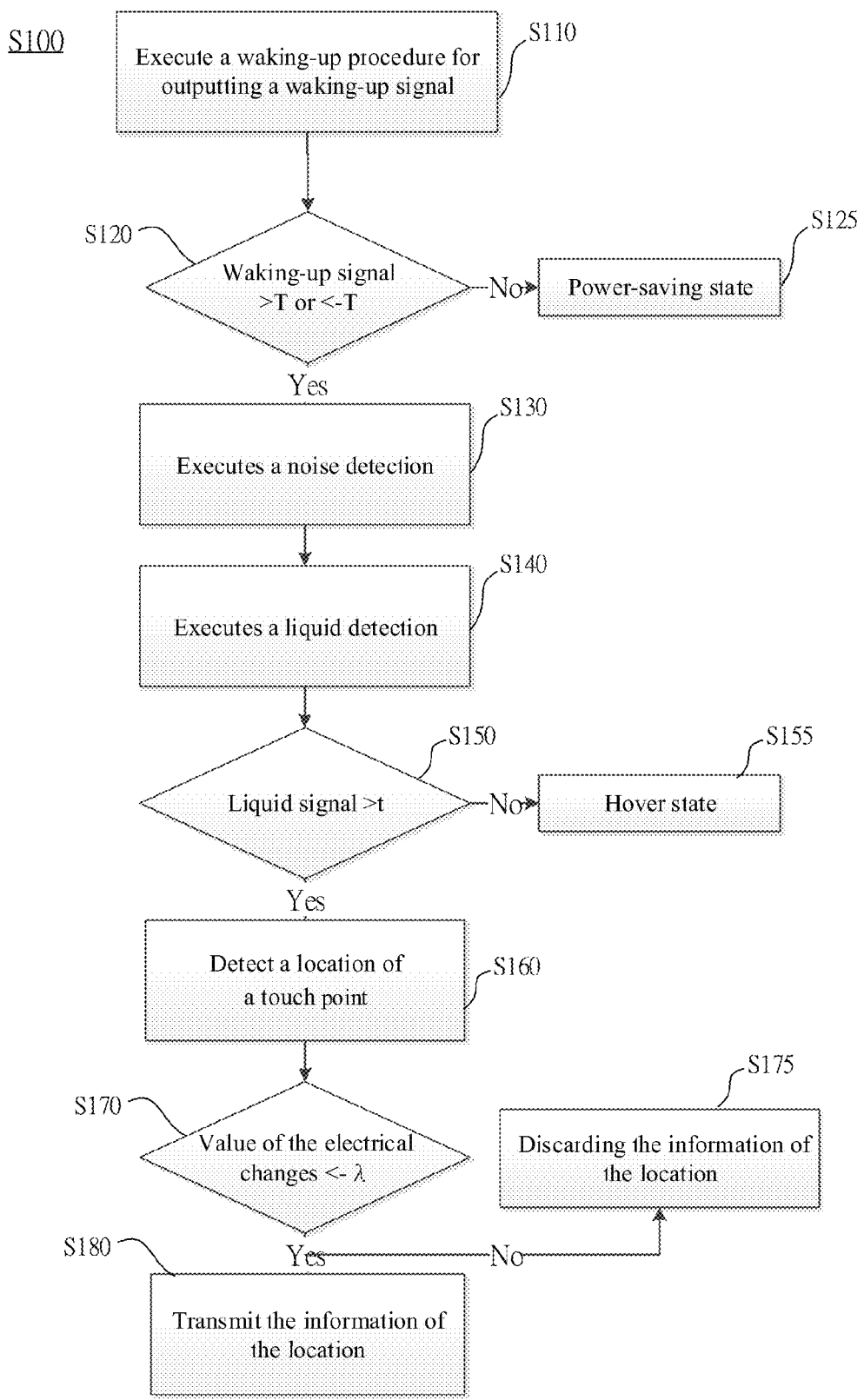
FIGS. 2 and 2A to 2D depict a flow chart of a controlling method for a touch panel according to an embodiment of the present invention.

Please refer to FIGS. 2 and 2A to 2D, a flow chart of a controlling method for a touch panel according to an embodiment of the present invention. The touch panel includes an active area, a processing module, a first electrical layer including a plurality of first electrodes and a second electrical layer including a plurality of second electrodes. The first electrical layer and the second electrical layer are disposed in the active area and electrically connected to the processing module, and the processing module includes a measurement unit for measuring electrical changes of the second electrodes. The controlling method S100 includes a waking-up procedure S110-S120 and a detection procedure S130-S180 as shown in FIG. 2. When the touch panel is on, started the step S100 that the processing module executes the waking-up procedure for outputting a waking-up signal. In the step S120, the processing module compares a measured value of the waking-up signal with a pre-determined threshold value T including a positive pre-determined threshold value T and/or a negative pre-determined threshold value −T. The processing module determines if the measured value of the waking-up signal is smaller than the positive pre-determined threshold value or larger than the negative pre-determined threshold value; if yes, go to the step S125 and the touch panel stays in a power-saving state until next waking-up procedure. If the measured value of the waking-up signal is larger than the positive pre-determined threshold value or smaller than the negative default threshold, go to the step S130 and the touch panel starts the detection procedure.

In the detection procedure, the processing module executes a noise detection for eliminating a background noise in the step S130; in the step S140, the processing module determines whether liquid is on the surface of the touch panel and outputs a liquid signal if yes. In the step S150, the processing module compares a measured value of the liquid signal and a pre-determined threshold value t; go to the step S155 and the touch panel turns to a hover state if the measured value of the liquid signal is smaller than or equal to the pre-determined threshold value t; go to the step S160 and the touch panel detects a location of a touch point if the measured value of the liquid signal is larger than the pre-determined threshold value t. The processing module drives one or most of the first electrodes in turn or in groups, and detects electrical changes of one or most of the second electrodes for determining the location of the touch point. Next, go to the step S170 of comparing the measured value of the electrical changes and another pre-determined threshold value −λ; go to the step S175 of the processing module discarding the information of the location if the measured value of the electrical changes is larger than or equal to the pre-determined threshold value −λ; go to the step S180 of the processing module transmitting the information of the location to other modules such as a CPU.

Figure 2A:
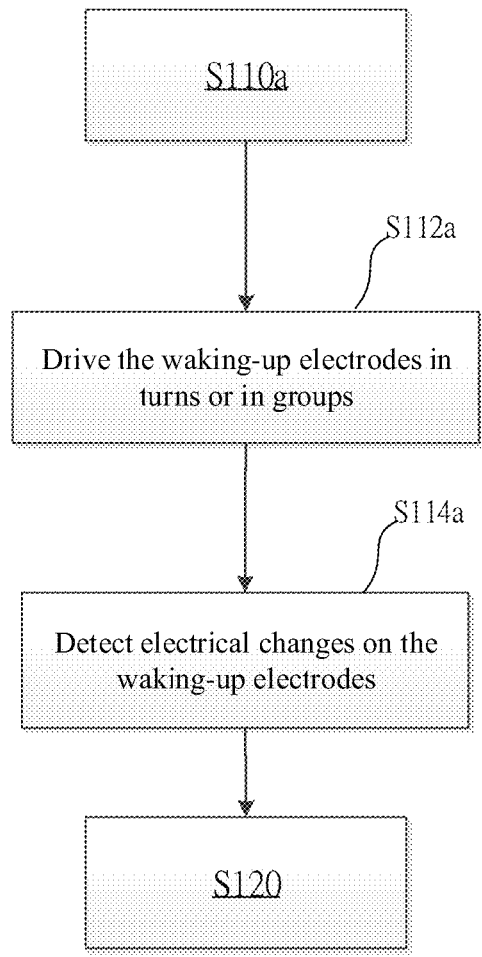
Figure 2B:
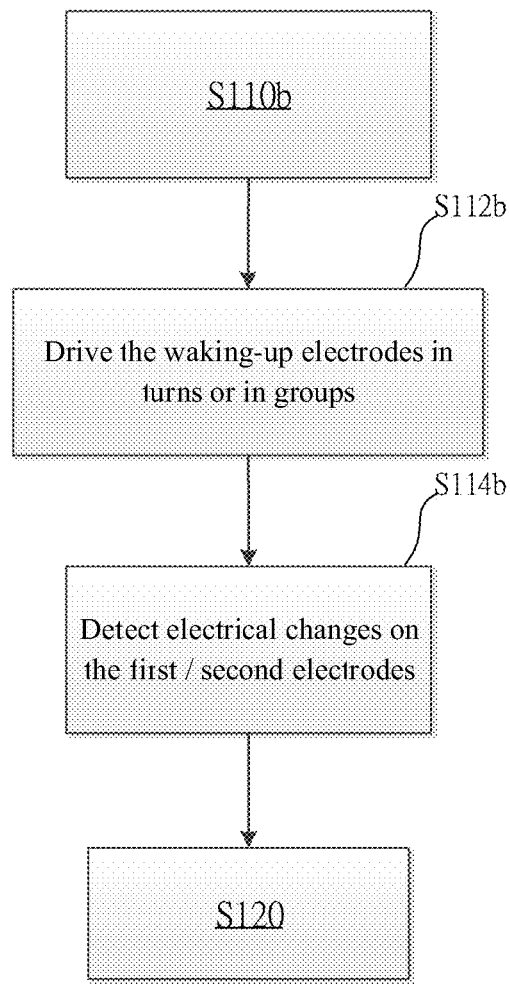

In an embodiment, the touch panel further includes a layer of waking-up electrodes. Refer to FIG. 2A, the steps of the waking-up procedure 110a are disclosed as follows. In the step S112a, the processing module drives the waking-up electrodes in turn or in groups. The processing module detects electrical changes of the waking-up electrodes for outputting the waking-up signal in the step S114a, and go back to the step S120. Refer to FIG. 2B, the steps of the waking-up procedure 110b are disclosed as follows. In the step S112b, the processing module drives the waking-up electrodes in turn or in groups. The processing module detects electrical changes of the first electrodes or the second electrodes for outputting the waking-up signal in the step S114b, and go back to the step S120. In said embodiment of the waking-up procedure 110a or 110b, the layer of the waking-up electrodes is disposed between the first electrical layer and the second electrical layer, and the shape of the waking-up electrodes are arranged in the active area for fitting in the shape of the first electrodes or the second electrodes. In another embodiment, the layer of the waking-up electrodes is disposed at the same layer with the first electrical layer and insulated from the first electrical layer, and the shape of the waking-up electrodes are arranged in the active area for fitting in shape of the first electrodes. In another embodiment, the layer of the waking-up electrodes is disposed at the same layer with the second electrical layer and insulated from the second electrical layer, and the shape of the waking-up electrodes are arranged in the active area for fitting in shape of the second electrodes.

Figure 2C:
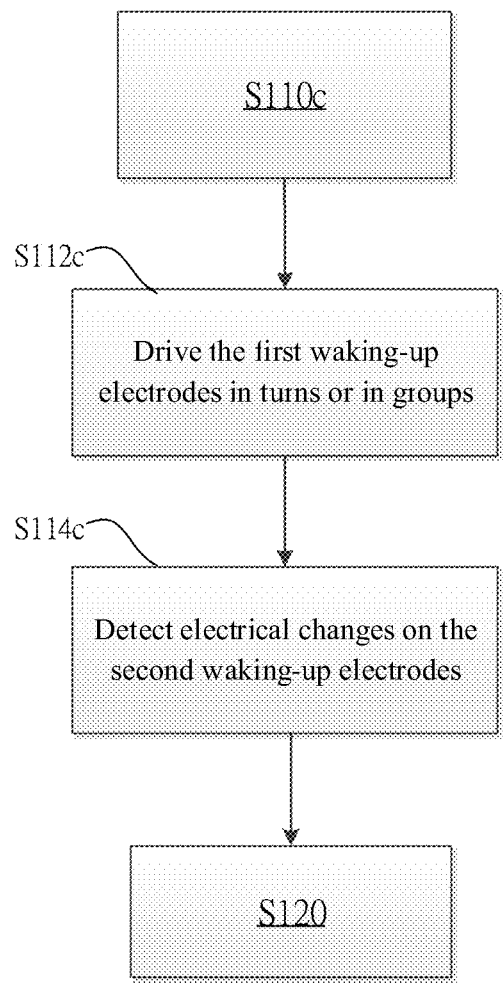

In another embodiment, the touch panel further includes a first layer of first waking-up electrodes and a second layer of second waking-up electrodes both disposed in the active area. Refer to FIG. 2C, the steps of the waking-up procedure 110c are disclosed as follows. In the step S112c, the processing module drives the first waking-up electrodes in turn or in groups. The processing module detects electrical changes of the second waking-up electrodes for outputting the waking-up signal in the step S114c, and go back to the step S120. In another embodiment, the steps of the waking-up procedure includes: the processing module driving one part of the waking-up electrodes in turn or in groups and detecting electrical changes of the other part of the waking-up electrodes for outputting the waking-up signal, and going back to the step S120. In said embodiment, the first layer of first waking-up electrodes is insulated from and at the same layer with the first electrical layer, and the second layer of second waking-up electrodes is insulated from and at the same layer with the second electrical layer. In another embodiment, the first layer of first waking-up electrodes is insulated from and at the same layer with the second electrical layer, and the second layer of second waking-up electrodes is insulated from and at the same layer with the first electrical layer.

Figure 2D:
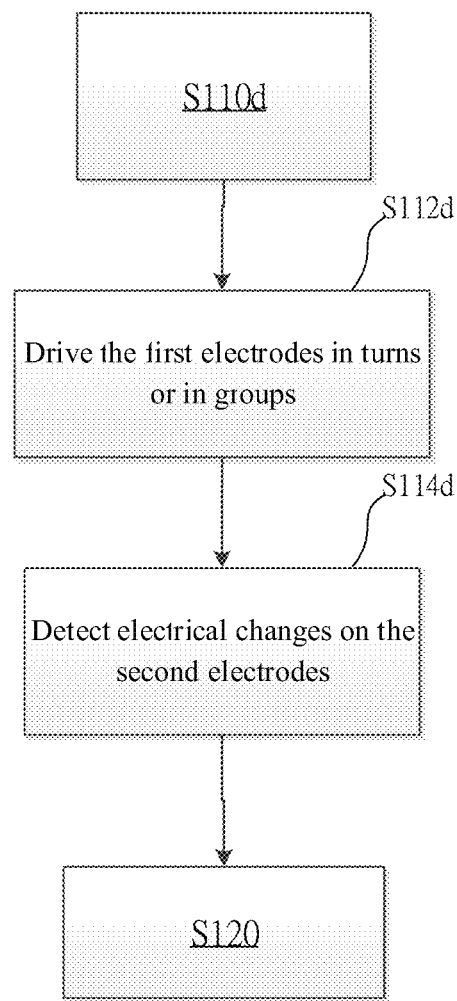

In another embodiment, the first electrical layer is for example a layer of driving electrodes, and the second electrical layer is for example a layer of sensing electrodes. The layer of driving electrodes or/and the layer of sensing electrodes is/are electrically connected to the measurement unit for measuring electrical changes. The processing module selectively drives the layer of driving electrodes or the layer of sensing electrodes, and the measurement unit respectively measures the electrical changes of the layer of sensing electrodes or the layer of driving electrodes for outputting a single waking-up signal. The steps of the waking-up procedure 110d in FIG. 2D are disclosed as follows. In the step S112d, the processing module drives all of the driving electrodes in turn or in groups. The processing module detects electrical changes of the sensing electrodes for outputting the single waking-up signal in the step S114d, and go back to the step S120. By driving all of the driving electrodes, the electrical changes of the sensing electrodes can be strengthened. In another embodiment, the steps of the waking-up procedure includes: the processing module driving all of the driving electrodes in turn or in groups and detecting electrical changes of the driving electrodes for outputting the single waking-up signal, and going back to the step S120. In another embodiment, the steps of the waking-up procedure include: the processing module driving one part of the driving electrodes in turn or in groups and detecting electrical changes of the other part of the driving electrodes for outputting the single waking-up signal, and going back to the step S120. In another embodiment, the steps of the waking-up procedure include: the processing module driving all of the sensing electrodes in turn or in groups and detecting electrical changes of the sensing electrodes for outputting the single waking-up signal, and going back to the step S120. In another embodiment, the steps of the waking-up procedure include: the processing module driving one part of the sensing electrodes in turn or in groups and detecting electrical changes of the other part of the sensing electrodes for outputting the single waking-up signal, and going back to the step S120. In another embodiment, the steps of the waking-up procedure include: the processing module driving the sensing electrodes in turn or in groups and detecting electrical changes of the driving electrodes for outputting the single waking-up signal, and going back to the step S120.

By said controlling method, the present invention can promptly determine if there is contact or approach on the surface of the touch panel with any touch point. After executing the waking-up procedure for outputting one single waking-up signal, the touch panel starts a detection procedure according to the waking-up signal for detecting a location of the touch point. The present invention can effectively decrease sampling times performed by the touch panel for detecting the location, so can reduce sampling frequency and cost the power down.

Figure 3A:
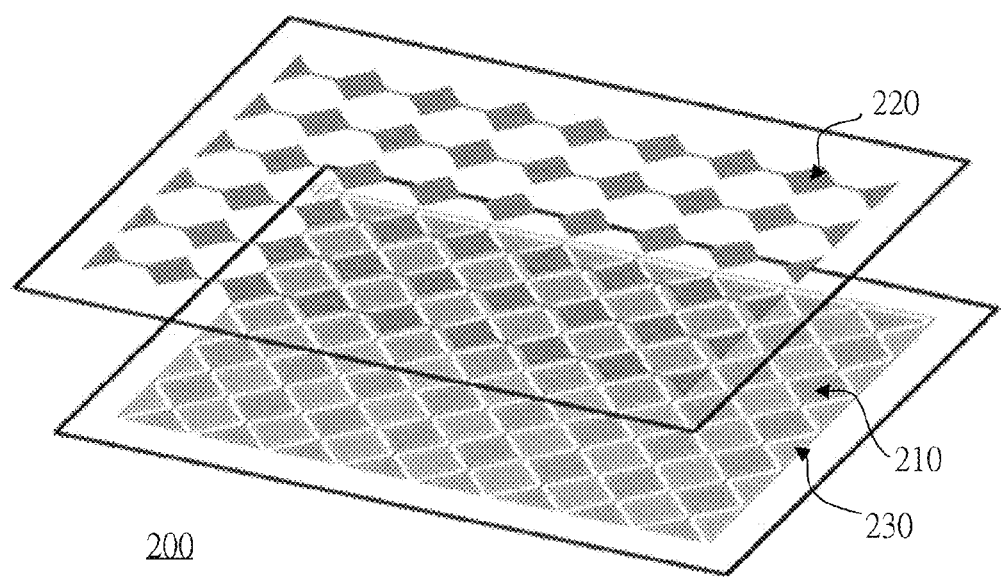
FIGS. 3A and 3B depict diagrams of a touch panel 200.
Figure 3B:
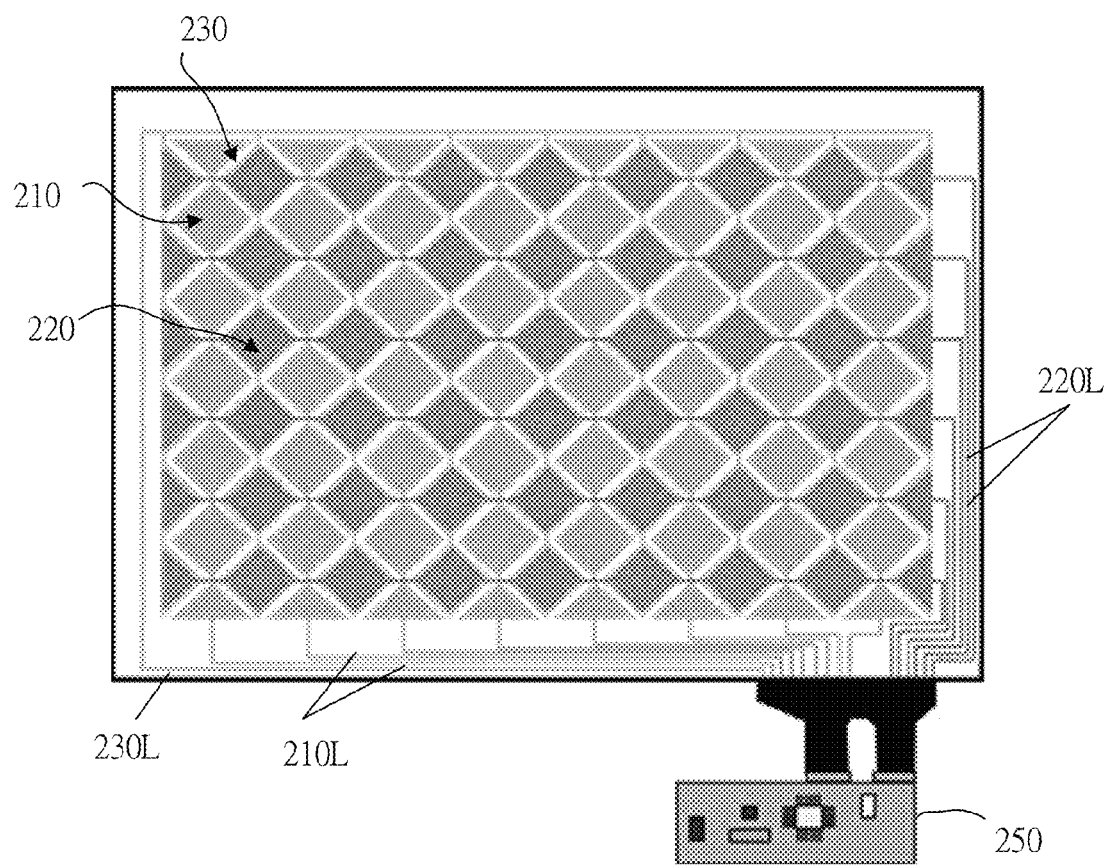

Please refer to FIGS. 3A and 3B, diagrams of a touch panel according to an embodiment of the present invention. The touch panel 200 with said controlling method according to the present invention includes an active area, a first electrical layer 210, including a plurality of first electrodes, a second electrical layer 220, including a plurality of second electrodes, and a layer of waking-up electrodes 230. The first electrical layer 210, the second electrical layer 220 and the layer of waking-up electrodes 230 are disposed in the active area, and the first electrical layer 210 and the layer of waking-up electrodes 230 are disposed under the second electrical layer 220. The layer of waking-up electrodes 230 is disposed at the same layer with the first electrical layer 210 and insulated from the first electrical layer 210, and the shape of the waking-up electrodes are arranged for fitting in the shape of the first electrodes. When looking down at FIG. 3B, the layer of the waking-up electrodes 230 overlaps but is insulated from the second electrical layer 230.

In another embodiment, the layer of waking-up electrodes 230 is disposed at the same layer with the first electrical layer 210 and insulated from the first electrical layer 210, and the shapes of the waking-up electrodes are arranged for fitting in the shape of the first electrodes and the second electrodes. In another embodiment, the layer of waking-up electrodes 230 is disposed at the same layer with the second electrical layer 220 and insulated from the second electrical layer 220, and the shapes of the waking-up electrodes are arranged for fitting in the shape of the second electrodes. In another embodiment, the layer of waking-up electrodes 230 is disposed at the same layer with the second electrical layer 220 and insulated from the second electrical layer 220, and the shapes of the waking-up electrodes are arranged for fitting in the shape of the first electrodes and the second electrodes. Said shape of the first electrodes and the second electrodes includes rhombus, diamond, triangle, strip, curve or s-shape.

The first electrical layer 210 includes a plurality of first strings, and said first electrodes are connected to form the first string. The second electrical layer 220 includes a plurality of second strings, and said second electrodes are connected to form the second string. The layer of the waking-up electrodes 230 includes a plurality of waking-up strings, and said waking-up electrodes are connected to form the waking-up string. The first strings are respectively connected to a processing module 250 by a plurality of first electric wires 210L. The second strings are respectively electrically connected to the processing module 250 by a plurality of second electric wires 220L. However, the waking-up strings are connected to the processing module 250 by a single third electric wires 230L. The processing module 250 can transmit the touch information, such as a location of a touch point, through other interfaces to other circuit or module such as a CPU.

In an embodiment, the processing module 250 drives all of the waking-up electrodes 230 in turn or in groups and detects electrical changes of the waking-up electrodes 230 for outputting the single waking-up signal. In another embodiment, the processing module 250 drives one part of the waking-up electrodes 230 in turn or in groups and detects electrical changes of the other part of the waking-up electrodes 230 for outputting the single waking-up signal. In another embodiment, the processing module 250 drives the waking-up electrodes 230 in turn or in groups and detects electrical changes of the first electrodes 210 or the second electrodes 220 for outputting the single waking-up signal. Based on the waking-up signal, the processing module 250 drives the first electrodes 210 in turn or in groups and detects electrical changes of the second electrodes 220 for determining a location of at least one touch point according to the detected electrical changes.

Figure 4:
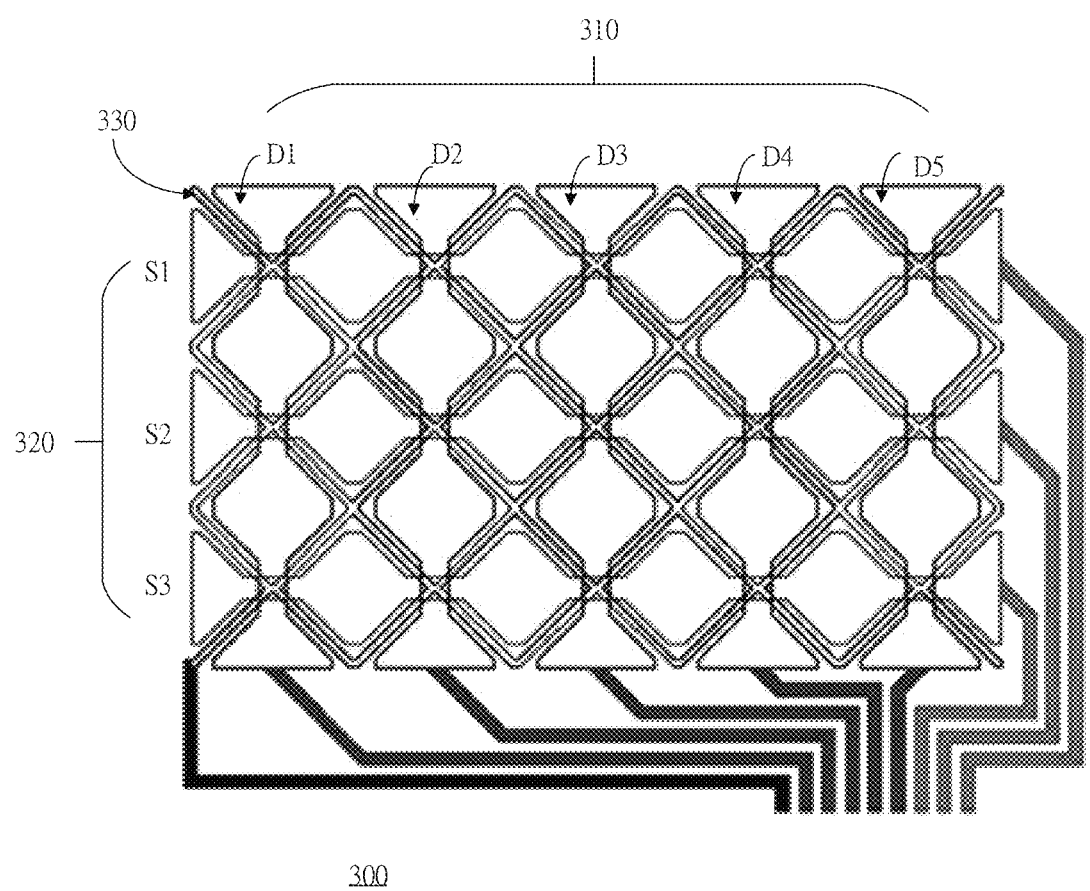
FIG. 4 depicts a diagram of a touch panel 300.

Refer to FIG. 4, a diagram of a touch panel 300 according to another embodiment of the present invention. The touch panel 300 with said controlling method according to the present invention includes an active area, a first electrical layer 310 including a plurality of first electrodes, a second electrical layer 320 including a plurality of second electrodes, and a layer of waking-up electrodes 330.

The first electrical layer 310, the second electrical layer 320 and the layer of the waking-up electrodes 330 are disposed in the active area, and the first electrical layer 310 and the layer of the waking-up electrodes 330 are disposed under the second electrical layer 320. A plurality of the second strings S1-S3 of the second electrical layer 320 are insulated from a plurality of the first strings D1-D5 of the first electrical layer 310. In an embodiment, the shape of the first electrodes in the first strings D1-D5 and the shape of the second electrodes in the second strings S1-S3 are rhombus and arranged for fitting each other. The first electrodes and the second electrodes do not overlap when looked down from top at FIG. 4.

The layer of waking-up electrodes 330 is insulated from the first electrical layer 310 and the second electrical layer 320. The shape of the waking-up electrodes is formed as an intersection or a continuous X-shape along the periphery of rhombus of the first and the second electrodes, and is arranged for fitting in the shape of the first and the second electrodes. The waking-up electrodes do not overlap the first electrodes and the second electrodes when looked down from the top at FIG. 4. In an embodiment, the layer of the waking-up electrodes 330 is disposed between the first electrical layer 310 and the second electrical layer 320, is insulated from the first electrical layer 310 and the second electrical layer 320 respectively by two insulating layers.

In an embodiment, the processing module drives all of the waking-up electrodes 330 in turn or in groups and detects electrical changes of the waking-up electrodes 330 for outputting the single waking-up signal. In another embodiment, the processing module drives one part of the waking-up electrodes 330 in turn or in groups and detects electrical changes of the other part of the waking-up electrodes 330 for outputting the single waking-up signal. In another embodiment, the processing module drives the waking-up electrodes 330 in turn or in groups and detects electrical changes of the first electrodes 310 or the second electrodes 320 for outputting the single waking-up signal. Based on the waking-up signal, the processing module drives the first electrodes 310 in turn or in groups and detects electrical changes of the second electrodes 320 for detecting a location of at least one touch point according to the detected electrical changes.

Figures 5A, 5B:
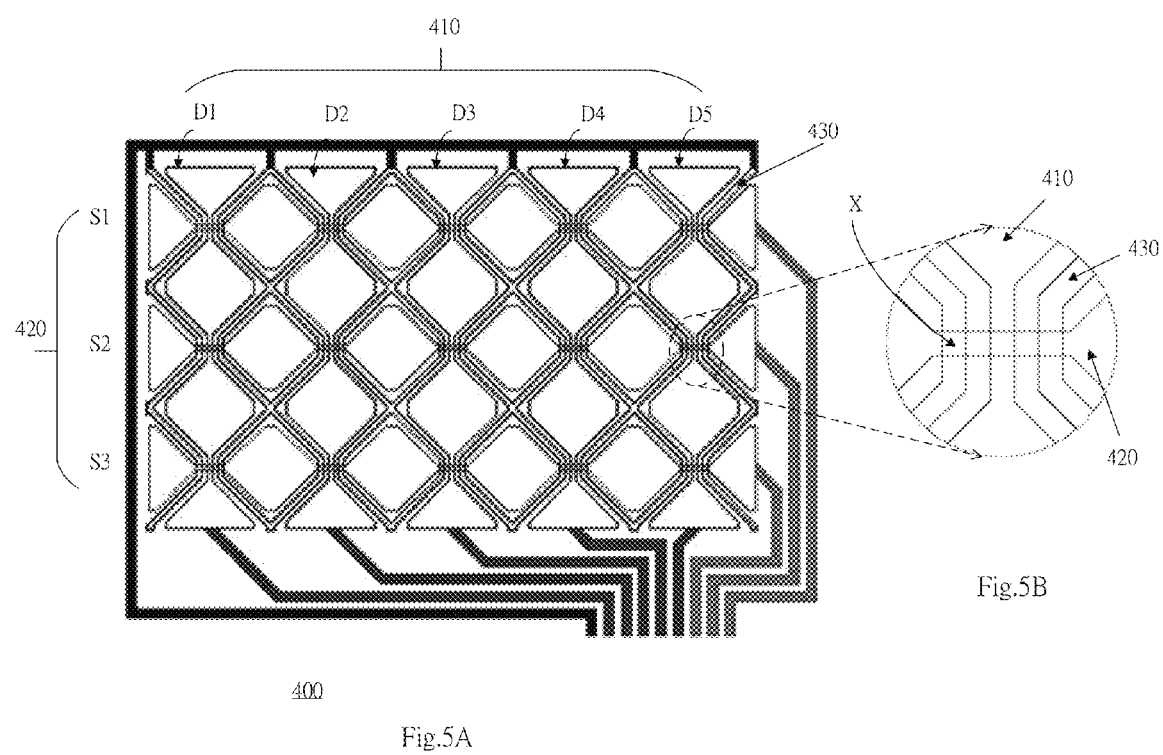
FIGS. 5A and 5B respectively depict a diagram of a touch panel 400 and an enlargement diagram of the first electrical layer 410 and the layer of waking-up electrodes 430 overlapping the second electrical layer 420.

Refer to FIGS. 5A and 5B, diagrams of a touch panel 400 according to another embodiment of the present invention. The touch panel 400 with said controlling method according to the present invention includes an active area, a first electrical layer 410 including a plurality of first electrodes, a second electrical layer 420 including a plurality of second electrodes, and a layer of waking-up electrodes 430. A plurality of second strings S1-S3 of the second electrical layer 420 are insulated from a plurality of first strings D1-D5 of the first electrical layer 410. In an embodiment, the shape of the first electrodes in the first strings D1-D5 and the shape of the second electrodes in the second strings S1-S3 are rhombus and arranged for fitting each other. The first electrodes and the second electrodes do not overlap when looked down from the top at FIG. 4. In an embodiment, the layer of the waking-up electrodes 330 is insulated from the first electrical layer 310 and the second electrical layer 320.

An enlargement diagram of the first electrical layer 410 and the layer of the waking-up electrodes 430 crossing the second electrical layer 420 is shown in FIG. 5B. The layer of the waking-up electrodes 430 is disposed at the same layer with the first electrical layer 410, and the shapes of the waking-up electrodes are arranged for fitting in the shape of the first electrodes. The shape of the waking-up electrodes is formed as a continuous rhombus frame along the periphery of rhombus of the first and the second electrodes, and is arranged for fitting in the shape of the first and the second electrodes. The layer of the waking-up electrodes 430 crossing the second electrical layer 420 has an overlapping area X but is insulated from the second electrical layer 420. The waking-up electrodes do not overlap the first electrodes and the second electrodes when looked down from the top at FIG. 4.

In an embodiment, the processing module drives all of the waking-up electrodes 430 in turn or in groups and detects electrical changes of the waking-up electrodes 430 for outputting the single waking-up signal. In another embodiment, the processing module drives one part of the waking-up electrodes 430 in turn or in groups and detects electrical changes of the other part of the waking-up electrodes 430 for outputting the single waking-up signal. In another embodiment, the processing module drives the waking-up electrodes 430 in turn or in groups and detects electrical changes of the first electrodes 410 or the second electrodes 420 for outputting the single waking-up signal. Based on the waking-up signal, the processing module drives the first electrodes 410 in turn or in groups and detects electrical changes of the second electrodes 420 for detecting a location of at least one touch point according to the detected electrical changes.

Figures 6A, 6B:
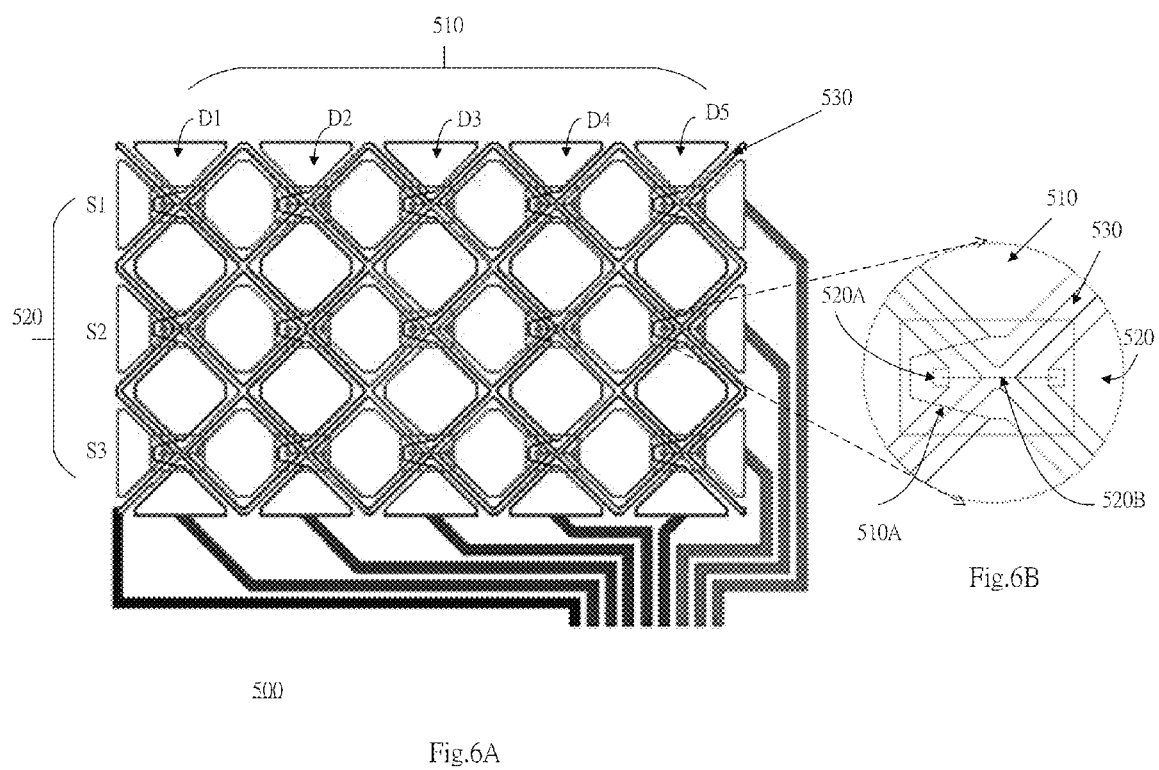
FIGS. 6A and 6B respectively depict a diagram of a touch panel 500 and an enlargement diagram of the first electrical layer 510 and the layer of waking-up electrodes 530 overlapping the second electrical layer 520.

Refer to FIGS. 6A and 6B, diagrams of a touch panel 500 according to another embodiment of the present invention. The touch panel 500 with said controlling method according to the present invention includes an active area, a first electrical layer 510 including a plurality of first electrodes, a second electrical layer 520 including a plurality of second electrodes, and a layer of waking-up electrodes 530. A plurality of second strings S1-S3 of the second electrical layer 520 are insulated from a plurality of first strings D1-D5 of the first electrical layer 510. In an embodiment, the shape of the first electrodes in the first strings D1-D5 and the shape of the second electrodes in the second strings S1-S3 are rhombus and arranged for fitting each other. The first electrodes and the second electrodes do not overlap when looked down from the top at FIG. 6A. The first electrodes of the first electrical layer 510 are electrically connected to each other by electrical wires 510A, and the second electrodes of the second electrical layer 520 are electrically connected to each other through a hole 520A by electrical wires 520B.

In an embodiment, the layer of the waking-up electrodes 530 is insulated from the first electrical layer 510 and the second electrical layer 520. An enlargement diagram of the first electrical layer 510 and the layer of the waking-up electrodes 530 crossing the second electrical layer 520 is shown in FIG. 6B. The layer of the waking-up electrodes 530 is disposed at the same layer with the first electrical layer 510. The shape of the waking-up electrodes is formed as an intersection or a continuous X-shape along the periphery of rhombus of the first and the second electrodes, and is arranged for fitting in the shape of the first and second electrodes. The waking-up electrodes do not overlap the first electrodes and the second electrodes when looked down from the top at FIG. 6A.

In an embodiment, the processing module drives all of the waking-up electrodes 530 in turn or in groups and detects electrical changes of the waking-up electrodes 530 for outputting the single waking-up signal. In another embodiment, the processing module drives one part of the waking-up electrodes 530 in turn or in groups and detects electrical changes of the other part of the waking-up electrodes 530 for outputting the single waking-up signal. In another embodiment, the processing module drives the waking-up electrodes 530 in turn or in groups and detects electrical changes of the first electrodes 510 or the second electrodes 520 for outputting the single waking-up signal. Based on the waking-up signal, the processing module drives the first electrodes 510 in turn or in groups and detects electrical changes of the second electrodes 520 for detecting a location of at least one touch point according to the detected electrical changes.

The embodiments in FIGS. 4-6B are disclosed, thereby the processing module driving the waking-up electrodes in turn or in group to scan the action region for outputting a single waking-up signal; and then, according to the waking-up signal, the processing module driving the first electrodes in turn or in groups and detecting electrical changes of the second electrodes for detecting a location of at least one touch point according to the detected electrical changes. By said layer of waking-up electrodes, the present invention can promptly determine if there is contact or approach on the surface of the touch panel with any touch point. After outputting one single waking-up signal, the touch panel starts a detection procedure according to the waking-up signal for detecting a location of the touch point. It can effectively decrease sampling times performed by the touch panel for detecting the location, so can reduce sampling frequency and cost less of the power.

In another embodiment, said shape of the first electrodes in the first strings D1-D5 and the second electrodes in the second strings S1-S3 includes rhombus, diamond, triangle, strip, curve or s-shape. The shape of the waking-up electrodes is arranged for fitting in the shape of the first electrodes and the second electrodes.

Figure 7A:
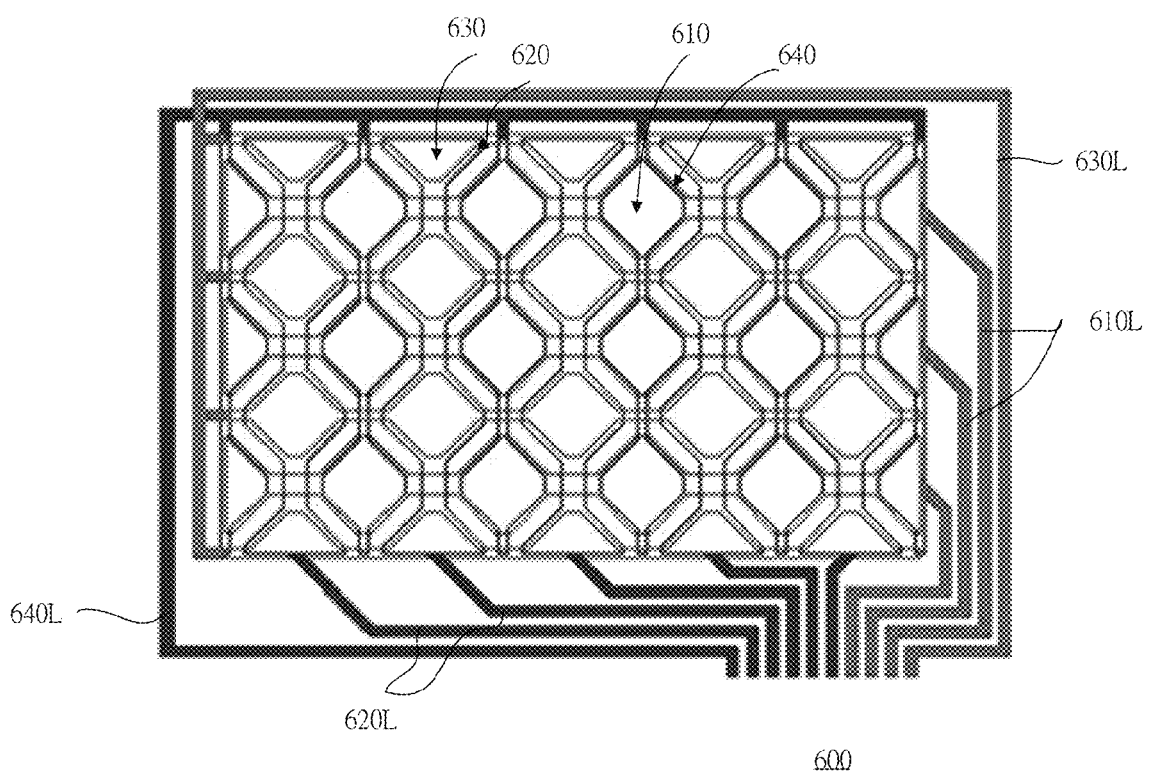
FIGS. 7A-7C depict diagrams of a touch panel 600.
Figure 7B:
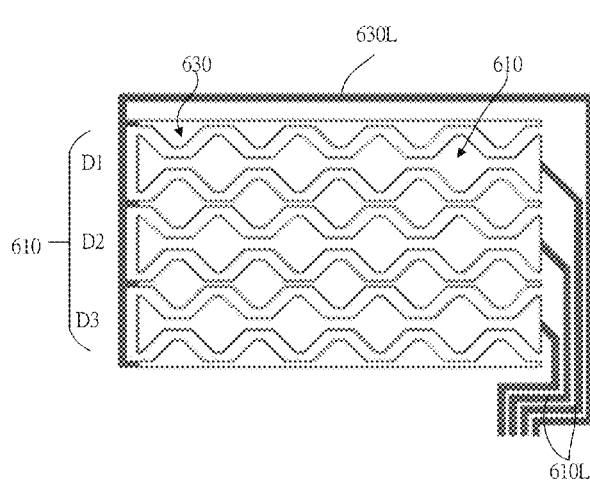
Figure 7C:
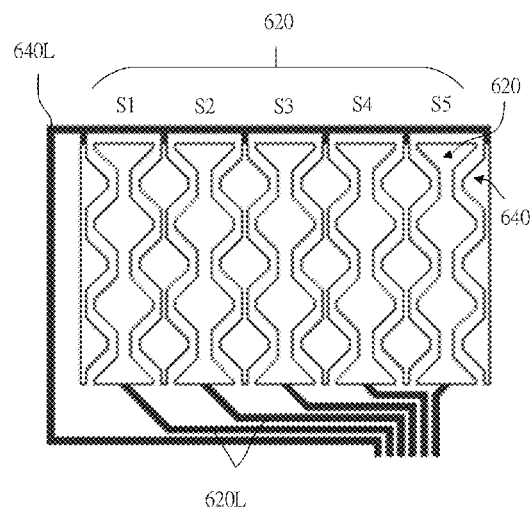

Please refer to FIGS. 7A-7C, diagrams of a touch panel 600 according to another embodiment of the present invention. The touch panel 600 with said controlling method according to the present invention includes an active area, a first electrical layer 610 including a plurality of first electrodes, a second electrical layer 620 including a plurality of second electrodes, a first layer of first waking-up electrodes 630 and a second layer of first waking-up electrodes 640. The first electrical layer 610 is insulated from the second electrical layer 620, and the shape of the first electrodes is arranged in the action region for fitting in the shape of the second electrodes. The first layer of the first waking-up electrodes 630 is insulated from the first electrical layer 610, and the second electrical layer 620, and the second layer of the first waking-up electrodes 640 is insulated from the first electrical layer 610, the second electrical layer 620 and the first layer of the first waking-up electrodes 630.

In FIG. 7B, the first layer of the first waking-up electrodes 630 is disposed at the same layer with the first electrical layer 610, and the shape of the first waking-up electrodes is arranged in the action region for fitting in the shape of the first electrodes. The first electrical layer 610 includes a plurality of the first strings D1-D3, and the first electrodes are connected in serial to form each of the first strings D1-D3. The first layer of the first waking-up electrodes 630 includes a plurality of the first waking-up strings, and the first waking-up electrodes is connected in serial to form each of the first waking-up strings. The first strings of the first electrical layer 610 are electrically connected to a processing module respectively by a plurality of the first electrical wires 610L, but the first waking-up strings of the first layer of the first waking-up electrodes 630 are electrically connected to the processing module only by a single third electrical wire 630L.

In FIG. 7C, the second layer of the second waking-up electrodes 640 is disposed at the same layer with the second electrical layer 620, and the shape of the second waking-up electrodes is arranged in the action region for fitting in the shape of the second electrodes. The second electrical layer 620 includes a plurality of the second strings S1-S5, and the second electrodes are connected in serial to form each of the second strings S1-S5. The second layer of the second waking-up electrodes 640 includes a plurality of the second waking-up strings, and the second waking-up electrodes are connected in serial to form each of the second waking-up strings. The second strings of the second electrical layer 620 are electrically connected to a processing module respectively by a plurality of second electrical wires 620L, but the second waking-up strings of the second layer of the second waking-up electrodes 640 are electrically connected to the processing module only by a single forth electrical wire 640L. The processing module can transmit touch information, such as a location of a touch point, through other interfaces to other circuit or module such as a CPU.

The processing module drives the first waking-up electrodes in turn or in group and detect detects electrical changes of the second waking-up electrodes for outputting the single waking-up signal. Based on the waking-up signal, the processing module drives the first electrodes in turn or in groups and detects electrical changes of the second electrodes for detecting a location of at least one touch point according to the detected electrical changes. In an embodiment, the shape of the first electrodes in the first strings D1-D3 and the second electrodes in the second strings S1-S5 includes rhombus, diamond, triangle, strip, curve or s-shape. The shape of the first and the second waking-up electrodes is arranged for fitting in the shape of the first electrodes and the second electrodes.

Above all, the present invention provides a controlling method for a touch panel. Compared to the conventional method of directly and repeatedly scanning the active area to execute a detection procedure, the present invention executes a waking-up procedure for determining if executing the detection procedure. Only after outputting one single waking-up signal by the waking-up procedure, the touch panel starts the detection procedure according to the waking-up signal for detecting a location of the touch point. The present invention can effectively decrease sampling times performed by the touch panel for detecting the location, so can reduce sampling frequency and effectively saving consumed power.

What is claimed is:

1. A controlling method for a touch panel, wherein the touch panel comprises an active area, a first electrical layer including a plurality of first electrodes, a second electrical layer including a plurality of second electrodes, and a layer of waking-up electrodes, the first electrical layer, second electrical layer and the layer of waking-up electrodes are disposed in the active area, the method comprising:
   executing a waking-up procedure for outputting a waking-up signal, the waking-up procedure comprising:
      driving the waking-up electrodes in turn or in groups, wherein the layer of waking-up electrodes is disposed between the first electrical layer and the second electrical layer, and shapes of the waking-up electrodes are arranged in the active area for fitting in shapes of the first electrodes or the second electrodes; and
      detecting electrical changes of the waking-up electrodes for outputting the waking-up signal;
   comparing a measured value of the waking-up signal with a pre-determined threshold value including a positive pre-determined threshold value and/or a negative pre-determined threshold value;
   the touch panel staying in a power-saving state if the measured value of the waking-up signal is smaller than the positive pre-determined threshold value or larger than the negative pre-determined threshold value; and
   activating a detection procedure if the measured value of the waking-up signal is larger than the positive pre-determined threshold value or smaller than the negative pre-determined threshold value, and the detection procedure comprising:
      driving the first electrodes in turn or in groups;
      detecting electrical changes of the second electrodes; and
      determining a location of at least one touch point according to the detected electrical changes.

2. The method according to claim 1, wherein the waking-up procedure further comprises:
   driving a part of the waking-up electrodes in turn or in groups; and,
   detecting electrical changes of the other part of the waking-up electrodes for outputting the waking-up signal.

3. The method according to claim 2, wherein the layer of waking-up electrodes is disposed by the first electrical layer or the second electrical layer, or between the first electrical layer and the second electrical layer, and the shapes of the waking-up electrodes are arranged in the active area for fitting in the shapes of the first electrodes or the second electrodes.

4. The method according to claim 1, wherein the touch panel further comprises a layer of waking-up electrodes disposed in the active area, and the waking-up procedure comprises:
   driving the waking-up electrodes in turn or in groups; and,
   detecting electrical changes of the first electrodes or the second electrodes for outputting the waking-up signal.

5. The method according to claim 4, wherein the layer of waking-up electrodes is disposed by the first electrical layer or the second electrical layer, or between the first electrical layer and the second electrical layer, and the shapes of the waking-up electrodes are arranged in the active area for fitting in the shapes of the first electrodes or the second electrodes.

6. The method according to claim 1, wherein the touch panel further comprises a first layer of first waking-up electrodes and a second layer of second waking-up electrodes both disposed in the active area, and the waking-up procedure comprises:
   driving the first waking-up electrodes in turn or in groups; and,
   detecting electrical changes of the second waking-up electrodes for outputting the waking-up signal.

7. The method according to claim 6, wherein the first layer of first waking-up electrodes is insulated from and at the same layer with the first electrical layer, and the second layer of second waking-up electrodes is insulated from and at the same layer with the second electrical layer.

8. The method according to claim 6, wherein the first layer of first waking-up electrodes is insulated from and at the same layer with the second electrical layer, and the second layer of second waking-up electrodes is insulated from and at the same layer with the first electrical layer.

9. The method according to claim 1, wherein the waking-up procedure comprises:
   driving the first electrodes in turn or in groups; and,
   detecting electrical changes of the first electrodes for outputting the waking-up signal.

10. The method according to claim 1, wherein the waking-up procedure comprises:
    driving the second electrodes in turn or in groups; and,
    detecting electrical changes of the second electrodes for outputting the waking-up signal.

11. The method according to claim 1, wherein the waking-up procedure comprises:
    driving the first electrodes in turn or in groups; and,
    detecting electrical changes of the second electrodes for outputting the waking-up signal.

12. The method according to claim 1, wherein the waking-up procedure comprises:
    driving the second electrodes in turn or in groups; and,
    detecting electrical changes of the first electrodes for outputting the waking-up signal.

13. A touch panel, comprising:
    an active area;

a first electrical layer including a plurality of first electrodes;
a second electrical layer including a plurality of second electrodes;
a layer of waking-up electrodes, in which the first electrical layer, the second electrical layer and the layer of waking-up electrodes are disposed in the active area, wherein the layer of waking-up electrodes is disposed between the first electrical layer and the second electrical layer, and shapes of the waking-up electrodes are arranged in the active area for fitting in shapes of the first electrodes or the second electrodes; and
a processing module, electrically connected to the first electrical layer, the second electrical layer and the layer of waking-up electrodes;
wherein the processing module drives the waking-up electrodes, and measures electrical changes of the waking-up electrodes, first electrodes or the second electrodes for outputting a waking-up signal; the processing module compares a measured value of the waking-up signal with a pre-determined threshold value including a positive pre-determined threshold value and/or a negative pre-determined threshold value; the touch panel stays in a power-saving state if the measured value of the waking-up signal is smaller than the positive pre-determined threshold value or larger than the negative pre-determined threshold value; and if the measured value of the waking-up signal is larger than the positive pre-determined threshold value or smaller than the negative default threshold, the touch panel starts a detection procedure for detecting a location of at least one touch point, in which the detection procedure is performed by the processing module driving the first electrodes and measuring electrical changes of the second electrodes for determining the location according to the detected electrical changes of the second electrodes.

* * * * *